(12) United States Patent
Brown

(10) Patent No.: US 7,437,680 B1
(45) Date of Patent: Oct. 14, 2008

(54) TIMED TEXT DISPLAY FOR COMMUNICATIONS DEVICES

(75) Inventor: Jason Brown, Round Rock, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 837 days.

(21) Appl. No.: 10/623,950

(22) Filed: Jul. 21, 2003

(51) Int. Cl.
*G06F 3/048* (2006.01)
*G06F 3/00* (2006.01)

(52) U.S. Cl. .......................... 715/808; 715/866

(58) Field of Classification Search ................. 445/558, 445/566; 715/808, 866
See application file for complete search history.

(56) References Cited

U.S. PATENT DOCUMENTS

| 6,178,324 B1 * | 1/2001 | Choquet et al. | 455/558 |
| 6,667,748 B1 * | 12/2003 | Hubbe et al. | 715/723 |
| 2002/0024536 A1 * | 2/2002 | Kahan et al. | 345/745 |

OTHER PUBLICATIONS

Digital cellular telecommunications system (Phase 2+) (GSM); Universal Mobile Telecommunications System (UMTS);USIM Application Toolkit (USAT); (3GPP TS 31.111 version 4.4.0 Release 4), ETSI 2001, Obtained (on Nov. 29, 2007) from: http://www.etsi.org/plugtests/images/History/smartcard1/TS131_111.pdf, pp. 10-14, 21, 24-25, 40, 52, 62-63, 131, 139, 146.*

Background information: Why do we need Variable Timeout (CR 31.111: T3-010136, T3-010136, T3-010137), Celltick Technologies,3GPP T3 #18, Sophia Antipolis, France, Mar. 1-2, 2001.*

Digital cellular telecommunications system (Phase 2+) (GSM); Universal Mobile Telecommunications System (UMTS); USIM Application Toolkit (USAT) (3GPP TS 31.111 version 5.0.0 Release 5), Mar. 2002 (hereinafter "Release 5") pp. 21-26,52-54, 72-74, and 163. From URL http://www.etsi.org.*

*Digital Cellular Telecommunications System (Phase 2+); Specification of the SIM Application Toolkit for the Subscriber Identity Module—Mobile Equipment (SIM-ME) Interface*, GSM 11.14 V. 5.90; 1996 (ETSI).

*Subscriber Identity Modules, Functional Characteristics*, GSM 02.17 v. 3.2.0; 1992 (ETSI).

*Digital Cellular Telecommunications System (Phase 2+); Specification of the Subscriber Identity Module—Mobile Equipment (SIM-ME) Interface*, GSM 11.11 V. 5.3.0; 1996 (ETSI).

* cited by examiner

*Primary Examiner*—Stephen Hong
*Assistant Examiner*—Samir Termanini
(74) *Attorney, Agent, or Firm*—Robert Z. Evora; Paul E. Knowlton, Esq.; Parks Knowlton LLC

(57) ABSTRACT

Methods and apparatuses are disclosed for displaying text on a communications device. One method controls a display using a Subscriber Identity Module application. The Subscriber Identity Module application specifies a duration for which text is displayed on the communications device. The duration specifies a time for which the text is displayed before clearing the text or until a user clears the text. The duration is defined by any attribute in the Subscriber Identity Module application. The attribute may comprise any command or data object, however, the attribute preferably comprises a "duration" data object for a DISPLAY TEXT command in the Subscriber Identity Module application.

15 Claims, 6 Drawing Sheets

| Description | Mandatory/Optional | Length |
|---|---|---|
| Proactive SIM command Tag | Mandatory | 1 |
| Length (A+B+C+D+E+F) | Mandatory | 1 or 2 |
| Command details | Mandatory | A |
| Device identities | Mandatory | B |
| Text string | Mandatory | C |
| Icon identifier | Optional | D |
| Immediate response | Optional | E |
| Duration | Optional | F |

FIG. 2

| Description | Mandatory/Optional | Length |
|---|---|---|
| Proactive SIM command Tag | Mandatory | 1 |
| Length (A+B+C+D+E+F) | Mandatory | 1 or 2 |
| Command details | Mandatory | A |
| Device identities | Mandatory | B |
| Text string | Mandatory | C |
| Icon identifier | Optional | D |
| Immediate response | Optional | E |
| Duration | Optional | F |

US 7,437,680 B1

TIMED TEXT DISPLAY FOR COMMUNICATIONS DEVICES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to applications resident on a Subscriber Identity Module (SIM) for mobile communications and, more particularly, to methods and apparatuses that specify timing parameters for which text is displayed on a communications device, thus providing a consistent "look and feel" between various manufacturers of communications devices.

2. Description of the Related Art

A similar "look and feel" is a concern for telecommunications service providers. When a user subscribes to GSM service, that user may select from many different designs of communications devices. These communications devices are manufactured by various companies, and these communications devices may have differing features, such as keypad designs, display devices, software operating systems, and others. The user's telecommunications service provider, however, usually offers a single, common Subscriber Identity Module profile for all users. Although all users utilize the same, common Subscriber Identity Module profile, the differing features between the various communications devices often prevent a common visual and audible experience for the users for Subscriber Identity Module-driven applications.

A Subscriber Identity Module resident application displaying text on the screen of a communications device using the Subscriber Identity Module Application Toolkit is an example. Today the display of text is for the most part at the discretion of the communications device. That is, the communications device determines when text, which has been displayed, is cleared from the display. The current Subscriber Identity Module Application Toolkit has a command (the DISPLAY TEXT command) that specifies how text is cleared on the display screen. This command has two options for clearing text: 1) clearing text after a delay determined by the communications device, and/or 2) waiting for the user to clear the text through some interaction with the communications device. In neither case, however, may the Subscriber Identity Module application specify timing parameters for this command—the timing is dependent upon parameters defined by the terminal handset. So, even though a telecommunications service provider may utilize a common Subscriber Identity Module application for all users, the differing timing parameters between the differing communications device creates a different "look and feel" despite the common Subscriber Identity Module application.

There is, accordingly, a need in the art for a similar "look and feel" for all the communications devices, a need for clearing text that is less dependent on differing communications devices, and a need for clearing text as determined by the Subscriber Identity Module application stored in the Subscriber Identity Module.

BRIEF SUMMARY OF THE INVENTION

The aforementioned problems, and other problems, are reduced by a methods and apparatuses that specify the duration for which text is displayed on a communications device. This invention allows the Subscriber Identity Module application to specify when to clear text on a communications device. No longer is text only cleared according to the timing parameters of the communications device. Because this invention allows the Subscriber Identity Module application to precisely determine when text is cleared from the display device, the Subscriber Identity Module application may now create a similar "look and feel" for all communications devices.

This invention discloses methods and apparatuses for displaying text on a communications device. One method controls a display using a Subscriber Identity Module application. The Subscriber Identity Module application specifies a duration for which text is displayed. The duration specifies a time for which the text is displayed before clearing the text and/or until a user clears the text. The duration is defined by an attribute in the Subscriber Identity Module application. The attribute may comprise any command or data object, however, the attribute preferably comprises a "duration" data object for a DISPLAY TEXT command sent to the communications device. The term "communications device," as used herein, encompasses a mobile terminal (sometimes called "mobile station" or "mobile equipment"), a personal data assistant (PDA), a camera, a computer, a digital music device, and/or any other communications device. The term "Subscriber Identity Module application" describes a program that is stored in a Subscriber Identity Module. The term "text" encompasses any letter(s), number(s), word(s), icon(s), image(s), picture(s), and/or file(s) that may be presented on a display of the communications device.

Another embodiment of this invention describes an apparatus. This apparatus includes a Subscriber Identity Module for use in a communications device. The Subscriber Identity Module stores a Subscriber Identity Module application in memory. The Subscriber Identity Module application specifies a duration for which text is displayed on the communications device. The Subscriber Identity Module application utilizes an attribute to specify the duration for which the text is displayed. The attribute may comprise any command or data object, however, the attribute preferably comprises a "duration" data object for a DISPLAY TEXT command sent to the communications device.

Still another embodiment of this invention describes yet another apparatus. Here the apparatus comprises circuitry, a display device, a microprocessor, and a Subscriber Identity Module. The circuitry is for at least one of receiving and transmitting signals. The display device is for presenting text to a user of the apparatus. The microprocessor is for controlling the circuitry and the display device. The Subscriber Identity Module executes a Subscriber Identity Module application stored in memory. The Subscriber Identity Module application includes an attribute specifying a time for which the text is displayed on the display device. The attribute may comprise any command or data object, however, the attribute preferably comprises a "duration" data object for a DISPLAY TEXT command sent to the communications device.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein:

FIG. 2 is a schematic illustrating the DISPLAY TEXT command from the GSM

Figure 3:
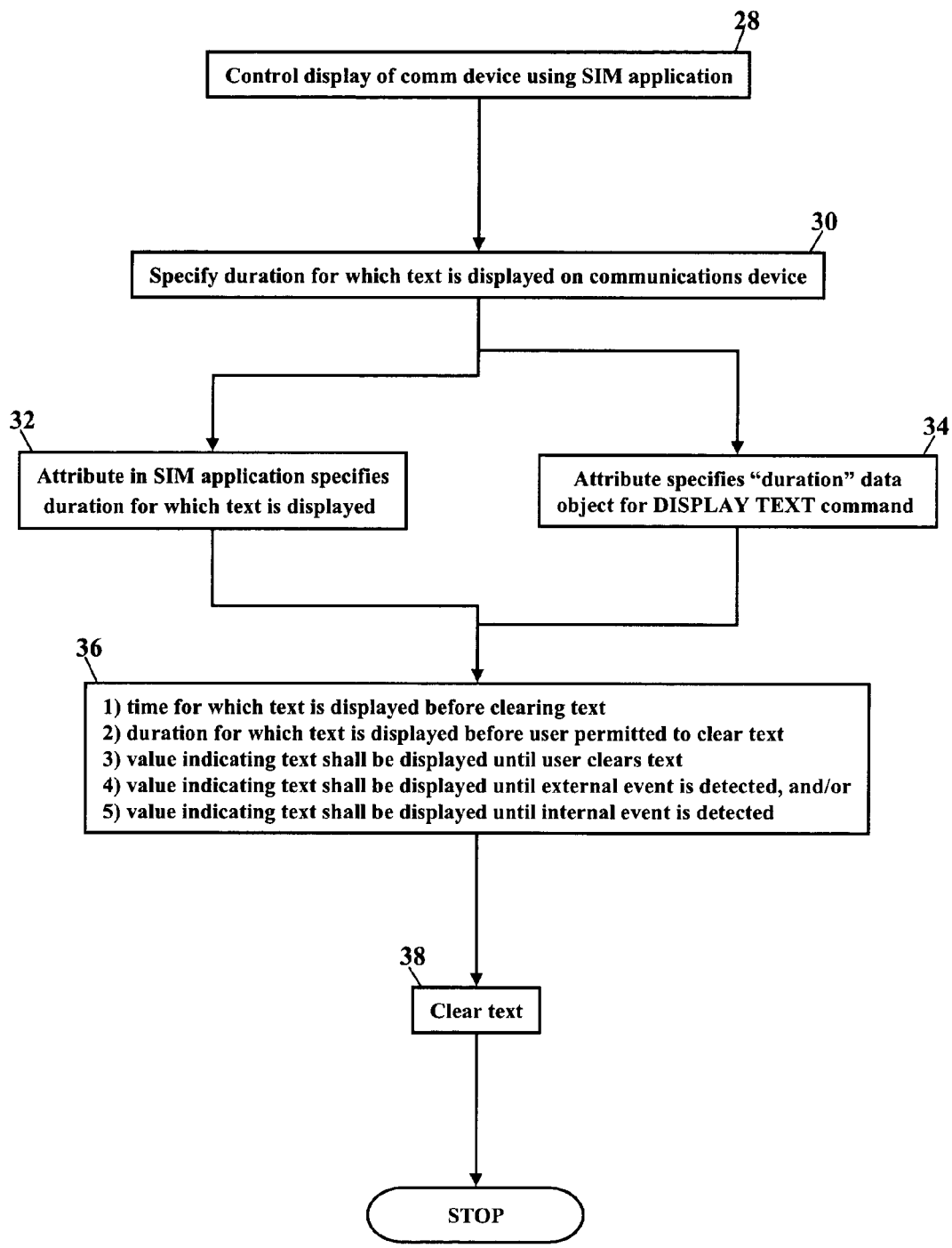
Figure 4:
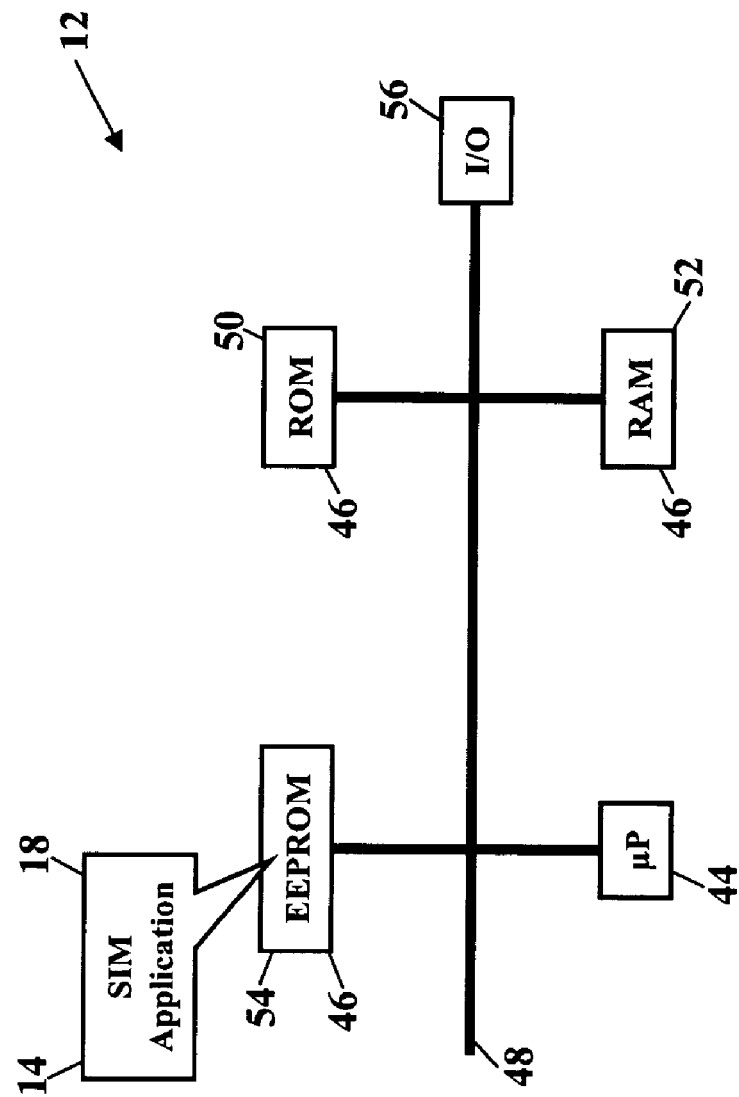
Figure 5:
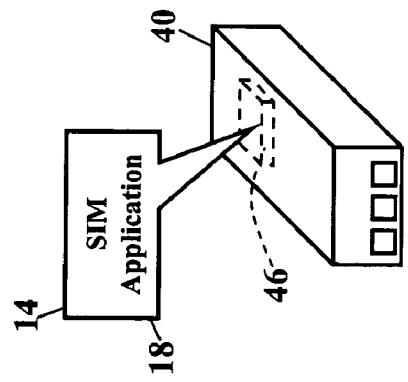
Figure 6:
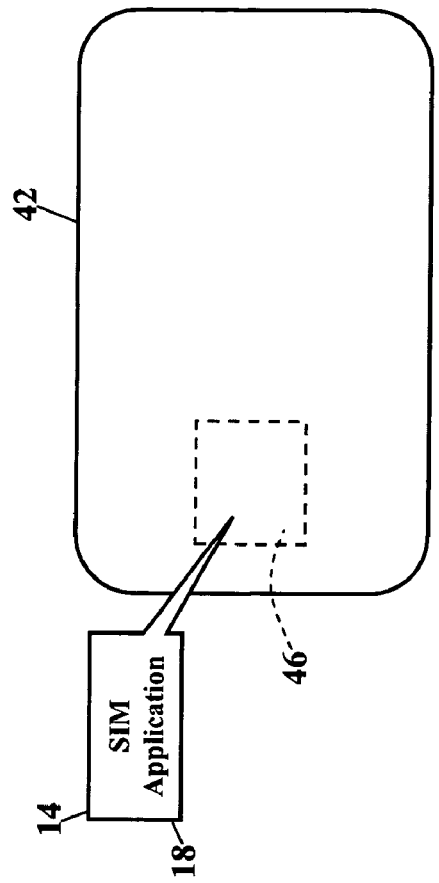
Figure 7:
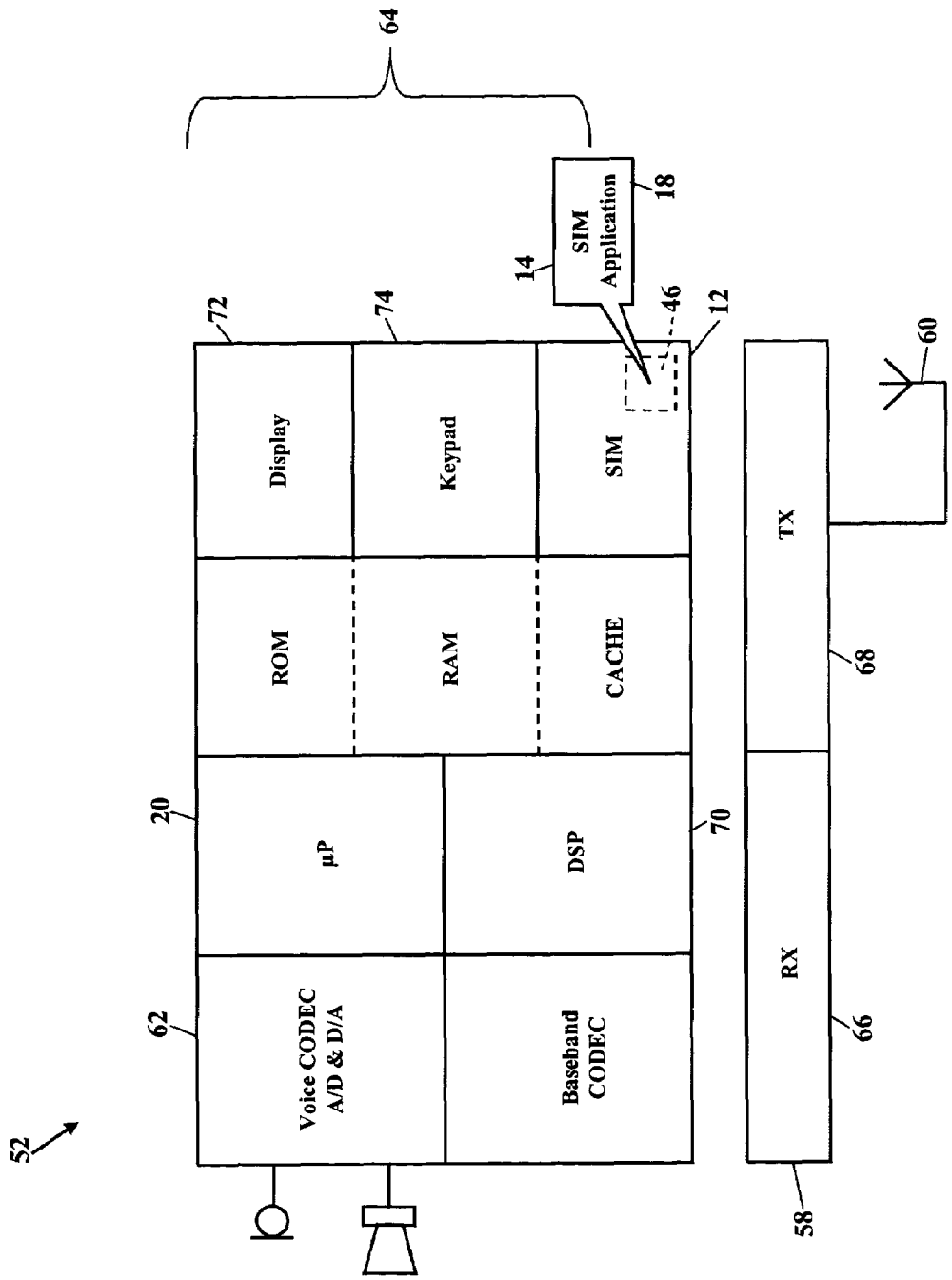

Subscriber Identity Module Toolkit Standard 11.14, according to an embodiment of this invention;

FIG. 3 is a flowchart illustrating a method for displaying text on a communications device according to an embodiment of this invention;

FIGS. 4-6 are schematics illustrating apparatuses for displaying text according to an embodiment of this invention; and FIG. 7 is a schematic illustrating yet another apparatus for displaying text according to an embodiment of this invention.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention provides methods and apparatuses for displaying text on a communications device. This invention specifies a duration in a Subscriber Identity Module application for which the text is displayed. The duration specifies a time for which the text is displayed before clearing the text and/or until a user clears the text. The duration is defined by an attribute in the Subscriber Identity Module application. The attribute may comprise any command or data object, however, the attribute preferably comprises a "duration" data object for a DISPLAY TEXT command sent to the communications device. No longer is text only cleared according to the timing parameters of the communications device. Because this invention allows the Subscriber Identity Module application to precisely determine when text is cleared from the display device, the Subscriber Identity Module application may now create a similar "look and feel" for all communications devices.

Figure 1:
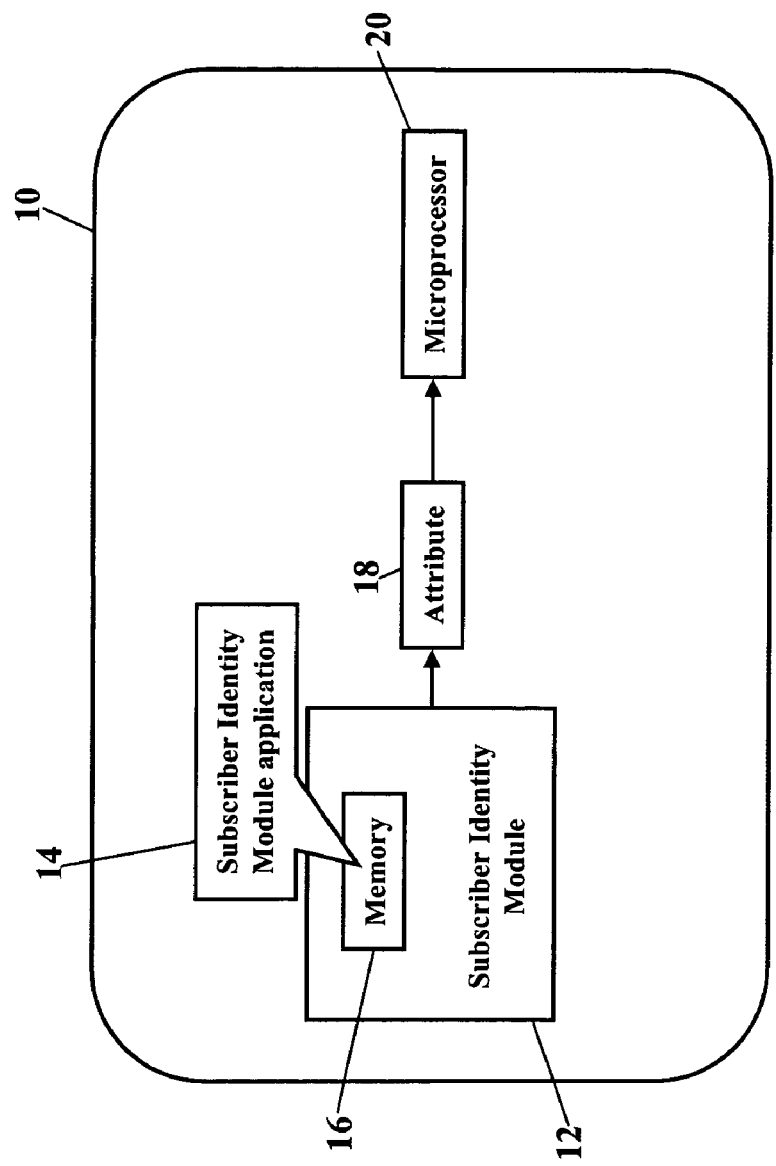
FIG. 1 is a block diagram illustrating an embodiment of this invention.

FIG. 1 is a block diagram illustrating an embodiment of this invention. FIG. 1 shows a communications device 10. The communications device 10 includes a Subscriber Identity Module 12, and the Subscriber Identity Module 12 stores a Subscriber Identity Module application 14 in memory 16. The Subscriber Identity Module application 14 communicates an attribute 18 to an on-board microprocessor 20 of the communications device 10. The attribute 18 is processed by the on-board microprocessor 20, and the attribute 18 specifies a duration for which text is displayed on the communications device 10. The attribute 18 may comprise any command or data object utilized by the Subscriber Identity Module application 14. The attribute 18 may specify a duration for which the text is displayed before clearing the text. The attribute 18 may additionally or alternatively specify a duration for which the text is displayed until a user clears the text. The attribute 18 may also include user-defined parameters, thus allowing the user to choose the duration of displayed text and, thus, override a preset duration. This attribute 18 allows the Subscriber Identity Module application 14 to precisely determine when text is cleared from a display device, thus providing a similar "look and feel" for all communications devices.

FIG. 2 is a schematic illustrating another embodiment of this invention. Here the attribute 18 comprises the DISPLAY TEXT command 22 from the GSM Subscriber Identity Module Toolkit Standard 11.14. Although the attribute 18 may comprise any command or data object, the DISPLAY TEXT command 22 was selected for ease of implementation. As those of ordinary skill in the art recognize, the GSM Subscriber Identity Module Toolkit is a telecommunications technical standard that defines a mechanism for a Subscriber Identity Module resident application to communicate and interact with a communications device. This DISPLAY TEXT command 22 allows a Subscriber Identity Module application to instruct the communications device (shown, respectively, as reference numerals 14 and 10 in FIG. 1) to display text, icons, and other graphics. This embodiment, however, adds a "duration" data object 24 to the DISPLAY TEXT command 22. This "duration" data object 24 is an optional timing parameter that determines the duration for which text is displayed on the communications device. The "duration" data object 24 is already used with another command (e.g., the PLAY TONE command), so the "duration" data object 24 could be reused for the DISPLAY TEXT command to quickly implement timed display of text. Because the DISPLAY TEXT command 22 from the GSM Subscriber Identity Module Toolkit standard is well known to those of ordinary skill in the art, this patent will only describe its pertinent features. If, however, the reader desires a more detailed explanation of the DISPLAY TEXT command 22, the reader is invited to consult the Global System for Mobile Communication (GSM) Standard 11.14, incorporated herein by reference in its entirety. The GSM Standard 11.14 is more formally known as "Digital Cellular Telecommunications System (Phase 2+) (GSM); *Specification of the Subscriber Identity Module application toolkit for the Subscriber Identity Module—Mobile Equipment (Subscriber Identity Module—ME) interface* (GSM 11.14 version 5.9.0 Release 1996)." This standard is available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org).

The "duration" data object 24 is a timing parameter. The "duration" data object 24 specifies a time for which the text is displayed before the text is cleared. The term "text" encompasses any letter(s), number(s), word(s), icon(s), image(s), picture(s), and/or file(s) that may be presented on a display device. As FIG. 2 shows, the "duration" data object 24 is added to the existing structure of the DISPLAY TEXT command 22. The "duration" data object 24 is preferably an "optional" data object; however, the "duration" data object 24 may, instead, be a mandatory data object. The "duration" data object 24 has a variable length "F" as defined in the GSM Standard 11.14. The "duration" data object 24 may specify the exact time for which the text is displayed before being cleared. The "duration" data object 24 may additionally or alternatively specify the duration for which the text is displayed before a user is permitted to clear the text. The "duration" data object 24 may additionally or alternatively specify the duration for which the text is displayed if the user does not first clear the text. The "duration" data object 24 may additionally or alternatively specify that the text shall be displayed until the user clears the text, thus allowing the user to override any automatic clearing of text.

The "duration" data object 24 provides an alternative timing parameter for the DISPLAY TEXT command 22. As those of ordinary skill in the art recognize, the DISPLAY TEXT command 22 already includes a "Command Details" data object 26. One feature of this "Command Details" data object 26 allows the Subscriber Identity Module application to specify how text should be cleared. The "Command Details" data object 26 provides two options for clearing text: 1) text is cleared after a delay determined by the communications device, and/or 2) wait for the user to clear the text through interaction with the communications device (e.g., keypad, touch screen display, voice command). The "Command Details" data object 26, however, does not permit the Subscriber Identity Module application to specify precise timing parameters for the DISPLAY TEXT command 22. The "duration" data object 24 of this invention, however, allows the Subscriber Identity Module application to determine the exact time for which text is displayed. Subscriber Identity Module application developers (such as a programmer or a service provider) utilizing the Subscriber Identity Module Application Toolkit may now select the timing parameter that best suits the developer's objectives.

The "duration" data object 24 also permits a more consistent "look and feel" despite varying manufacturers' terminals. The "Command Details" data object 26, as mentioned before, does not permit the Subscriber Identity Module application to specify precise timing parameters for the DISPLAY TEXT command 22. The "duration" data object 24 of this invention, however, allows the Subscriber Identity Module application itself to determine the exact time for which text is displayed. Because the Subscriber Identity Module application may now determine the timing of displayed text, this invention permits the Subscriber Identity Module application to create a more consistent "look and feel" between varying terminals. A telecommunications service provider, utilizing a single Subscriber Identity Module application, may now have a more consistent display presentation even though the Subscriber Identity Module application operates in differing communications devices.

FIG. 3 is a flowchart illustrating a method for displaying text on a communications device. A Subscriber Identity Module application is used to control a display of a communications device (Block 28). The Subscriber Identity Module application specifies a duration for which text is displayed (Block 30). An attribute in the Subscriber Identity Module application specifies the duration for which the text is displayed (Block 32). Although the attribute may comprise any command or data object, the attribute preferably specifies a "duration" data object for a DISPLAY TEXT command (Block 34). The specified duration may comprise 1) a time for which the text is displayed before clearing the text, 2) the duration for which the text is displayed before a user is permitted to clear the text, 3) a value indicating that the text shall be displayed until a user clears the text, 4) a value indicating that the text shall be displayed until an external event is detected, and/or 5) a value indicating that the text shall be displayed until an internal event is detected (Block 36). The external event could include receiving an incoming call, an incoming page, an incoming text message, an incoming instant message, an incoming data message (e.g., picture file), an advertisement, a network notification of a change in time zone, a network notification of a roaming/no service, or any other notification from a network operator. The internal event could include a low battery indication, an alarm, a calendar entry or calendared event, a reminder, a memo, a voice note, an authentication/security alert, or any other notification generated by the communications device. After any duration has elapsed, or when any internal/external event is detected, the text is then cleared (Block 38). The "duration" data object 24 provides an alternative timing parameter for Subscriber Identity Module application developers, and the "duration" data object 24 also permits a more consistent "look and feel" between varying communications devices.

FIGS. 4-6 are schematics illustrating apparatuses for displaying text according to this invention. FIG. 4 is a block diagram of the Subscriber Identity Module 12 shown in FIG. 1, while FIGS. 5 and 6 illustrate, respectively, the Subscriber Identity Module 12 embodied in a plug 40 and the Subscriber Identity Module 12 embodied in a card 42. As those of ordinary skill in the art recognize, the Subscriber Identity Module 12 stores user information (such as the user's International Mobile Subscriber Identity, the user's $K_i$ number, and other user information) and the Subscriber Identity Module application 14. As those of ordinary skill in the art also recognize, the plug 40 and the card 42 each interface with the communications device according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995-01))." The GSM Standard 11.11 is formally known as "Digital cellular telecommunications system (Phase 2+) (GSM); *Specification of the Subscriber Identity Module—Mobile Equipment (Subscriber Identity Module—ME) interface* (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "*Information technology—Identification cards—Integrated circuit(s) cards with contacts*," and the standard is available from the International Organization for Standardization (ISO) (1, rue de Varembé, Case, postale 56CH-1211 Geneva 20, Switzerland, Telephone +41 22 749 01 11, Telefax +41 22 733 34 30, www.iso.org).

FIG. 4 is a block diagram of the Subscriber Identity Module 12, whether embodied as the plug 40 of FIG. 5 or as the card 42 of FIG. 6. Here the Subscriber Identity Module 12 comprises a microprocessor 44 (µP) communicating with memory modules 46 via a data bus 48. The memory modules may include Read Only Memory (ROM) 50, Random Access Memory (RAM) and or flash memory 52, and Electrically Erasable-Programmable Read Only Memory (EEPROM) 54. The Subscriber Identity Module 12 stores the Subscriber Identity Module application 14 in one or more of the memory modules 46. FIG. 4 shows the Subscriber Identity Module application 14 residing in the Erasable-Programmable Read Only Memory 54, yet the Subscriber Identity Module application 14 could alternatively or additionally reside in the Read Only Memory 50 and/or the Random Access/Flash Memory 52. An Input/Output module 56 handles communication between the Subscriber Identity Module 12 and the communications device. Because Subscriber Identity Modules are well known in the art, this patent will not further discuss the operation and the physical/memory structure of the Subscriber Identity Module 12. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

The Subscriber Identity Module application 14 comprises the attribute 18. The attribute 18 is communicated from the Subscriber Identity Module application 14 to the communications device, and the attribute 18 determines a time for which the text is displayed before the text is cleared. The attribute 18 may additionally or alternatively determine the duration for which the text is displayed before a user is permitted to clear the text. The attribute 18 may additionally or alternatively specify the duration for which the text is displayed if the user does not first clear the text. The attribute 18 may additionally or alternatively specify that the text shall be displayed until a user clears the text.

FIG. 7 is a schematic illustrating yet another apparatus for displaying text according to this invention. FIG. 7 is a block diagram of the communications device 10 utilizing the attribute 18 of this invention. Here the communications device 10 comprises a radio transceiver unit 58, an antenna 60, a digital baseband chipset 62, and a man/machine interface (MMI) 64. The transceiver unit 58 includes transmitter circuitry 66 and receiver circuitry 68 for receiving and transmitting radio-frequency (RF) signals. The transceiver unit 58 couples to the antenna 60 for converting electrical current to and from electromagnetic waves. The digital baseband chipset 62 contains a digital signal processor (DSP) 70 and performs signal processing functions for audio (voice) signals and RF signals. As FIG. 7 shows, the digital baseband chipset 62 may also include the on-board microprocessor 20 that interacts with the man/machine interface (MMI) 64. The man/machine interface (MMI) 64 may comprise a display device 72, a keypad 74, and the Subscriber Identity Module 12. The on-board microprocessor 20 performs GSM protocol functions and control functions for the radio circuitry 66 and 68, for the display device 72, and for the keypad 74. The on-board microprocessor 20 may also interface with the Subscriber Identity Module 12 and with the Subscriber Identity Module application 14 residing in the memory module 46 of the Subscriber Identity Module 12. The Subscriber Identity Module 12 executes the Subscriber Identity Module application 14, and the Subscriber Identity Module application 14 includes the attribute 18 of this invention. The attribute 18 specifies a time for which the text is displayed on the display device 72. Because the functional architecture of the communications device 10 is well known to those of ordinary skill in the art, the communications device 10 will not be further discussed. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

While this invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method for timed text display on a communications device, said method comprising:

controlling a display of a communications device using a Subscriber Identity Module (SIM) application; and specifying a minimum duration in said SIM application for which text must be displayed;

wherein the minimum duration must lapse prior to permitting a user to clear said text, and wherein said step of specifying a duration comprises setting the value of a duration data object for a DISPLAY TEXT command in said SIM application.

2. The method of claim 1, further comprising:

displaying text on said communications device;

receiving a command to clear said text;

if said specified duration has elapsed, then executing said command.

3. The method of claim 1, wherein said duration data object is a parameter in said DISPLAY TEXT command.

4. The method of claim 2, further comprising:

if said specified duration has not elapsed, then disregarding said command.

5. The method of claim 2, wherein the step of displaying text comprises displaying any of the following: letters, numbers, words, icons, images, pictures.

6. A computer-readable medium comprising computer-executable instructions, which, when executed, cause a computer to perform the steps of:

controlling a display of a communications device using a Subscriber Identity Module (SIM) application; and specifying a minimum duration for which text must be displayed;

wherein the minimum duration must lapse prior to permitting a user to clear said text, and wherein said step of specifying a duration comprises setting the value of a duration data object for a DISPLAY TEXT command in said SIM application.

7. The computer-readable medium of claim 6, further comprising:

displaying text on said communications device;

receiving a command to clear said text;

if said specified duration has elapsed, then executing said command.

8. The computer-readable medium of claim 6, wherein said duration data object is a parameter in said DISPLAY TEXT command.

9. The computer-readable medium of claim 7, further comprising:

if said specified duration has not elapsed, then disregarding said command.

10. The computer-readable medium of claim 7, wherein the step of displaying text comprises displaying any of the following: letters, numbers, words, icons, images, pictures.

11. An apparatus for displaying timed text, said apparatus comprising:

a Subscriber Identity Module (SIM) comprising a memory, said memory being configured to store a SIM application;

said SIM application configured to specify a minimum duration in the SIM application for which text must be displayed and a display device for presenting said text to a user of the apparatus;

wherein the minimum duration must lapse prior to permitting a user to clear said text, and wherein said SIM application comprises a duration data object for a DISPLAY TEXT command.

12. The apparatus of claim 11, wherein said SIM application is further configured to:
   receive a command to clear said text; and
   execute said command, if said duration has elapsed.

13. The apparatus of claim 11, wherein said duration data object is a parameter in said DISPLAY TEXT command.

14. The apparatus of claim 12, wherein said SIM application is further configured to disregard said command, if said duration has not elapsed.

15. The apparatus of claim 12, wherein said text comprises any of the following: letters, numbers, words, icons, images, pictures.

* * * * *